United States Patent [19]
Malone

[11] Patent Number: 5,577,346
[45] Date of Patent: Nov. 26, 1996

[54] MULTI-ZONE MOLTEN-METAL HYDROGEN AND FUEL GAS GENERATION PROCESS

[75] Inventor: Donald P. Malone, Grayson, Ky.

[73] Assignee: Ashland Inc., Ashland, Ky.

[21] Appl. No.: 421,102

[22] Filed: Apr. 13, 1995

Related U.S. Application Data

[63] Continuation-in-part of Ser. No. 51,753, Apr. 22, 1993, abandoned, which is a continuation-in-part of Ser. No. 939,533, Sep. 1, 1992, abandoned, which is a continuation of Ser. No. 763,097, Sep. 20, 1991, abandoned, which is a continuation-in-part of Ser. No. 542,234, Jun. 21, 1990, abandoned.

[51] Int. Cl.$^6$ .................................................. C10J 3/06
[52] U.S. Cl. .................. 48/197 R; 48/198.2; 48/92; 48/206; 48/209; 423/648.1; 423/650
[58] Field of Search ..................... 48/197 R, 198.2, 48/202, 206, 209, 92, DIG. 2, DIG. 4; 202/373; 423/650, DIG. 12, 698.1, 418.2

[56] References Cited

U.S. PATENT DOCUMENTS

| | | | |
|---|---|---|---|
| 4,187,672 | 2/1980 | Rasor | 60/39.12 |
| 4,338,096 | 7/1982 | Mayes | 422/110 |
| 4,574,714 | 3/1986 | Bach et al. | 110/341 |

FOREIGN PATENT DOCUMENTS

| | | | |
|---|---|---|---|
| 2186524 | 1/1979 | France | 48/92 |

*Primary Examiner*—Peter Kratz
*Attorney, Agent, or Firm*—Richard C. Willson, Jr.; Donald E. Zinn

[57] ABSTRACT

A plural-zone molten metal iron gasifier for converting feeds containing hydrogen and carbon, such as propane, solvent deasphalted pitch, etc., into substantially pure hydrogen and $CO/CO_2$ streams under pressure by incorporating carbo into the molten metal in a first zone or vessel, then circulating the molten metal into contact with an oxygen-containing gas in a second zone or vessel. Preferably hydrogen is primarily produced in a third zone or vessel, and carbon oxides in a second zone or vessel. A one-meter diameter vessel can produce 20 million standard cubic feet per day of hydrogen at a pressure in the range 2 to 50 atm from methane using this invention.

6 Claims, 1 Drawing Sheet

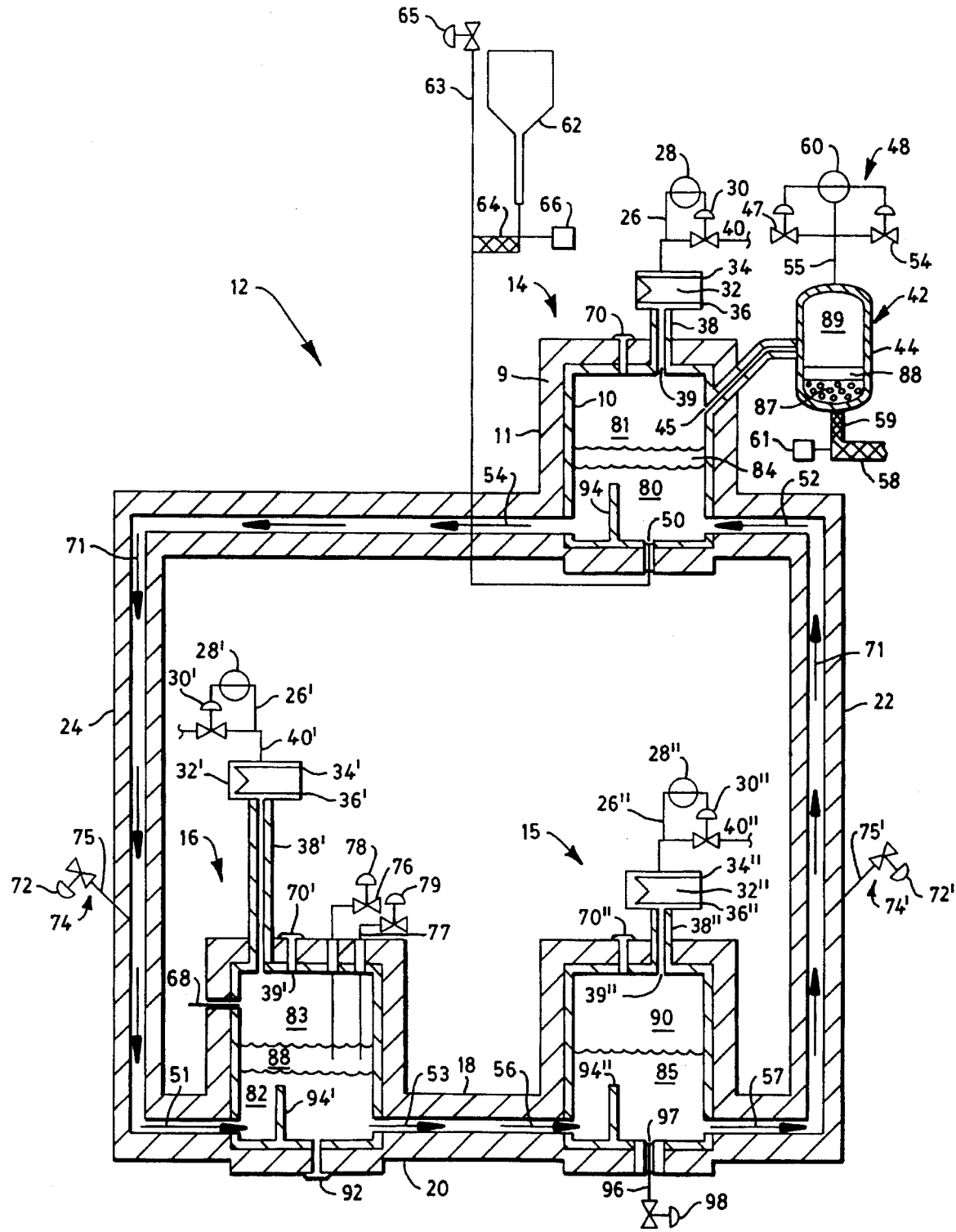

MULTI-ZONE MOLTEN-METAL HYDROGEN AND FUEL GAS GENERATION PROCESS

This is a continuation-in-part application of U.S. patent application Ser. No. 08/051,753, filed Apr. 22, 1993 (attorney docket 6391MUS), which is itself a continuation-in-part application of U.S. patent application Ser. No. 939,533, filed Sep. 1, 1992 (attorney docket 6391BUS), which is itself a continuation of U.S. Ser. No. 763,097, filed Sep. 20, 1991 (attorney docket 6391AUS), which is itself a continuation-in-part application of U.S. patent application ser. No. 542,234, filed Jun. 21, 1990 (attorney docket No. 6333AUS) all abandoned.

CROSS REFERENCE TO RELATED APPLICATIONS

U.S. patent application Ser. No. 838,642, filed Feb. 20, 1992 (attorney docket no. 6333DUS); U.S. patent application Ser. No. 08/051,753, filed Apr. 22, 1993 (attorney docket no. 6391MUS) now abandoned; U.S. patent application Ser. No. 08/165,068, filed Dec. 10, 1993 (attorney docket no. 6431BUS), and now U.S. Pat. No. 5,435,814; U.S. Ser. No. 08/163,468, filed Dec. 7, 1993 (attorney docket no. 6431MUS) now abandoned; and U.S. Ser. No. 08/303,806, filed Sep. 9, 1994 (attorney docket no. 6464AUS) relate to the general field of the present invention.

BACKGROUND OF THE INVENTION

1. Field of the Invention

The general field of this invention relates to the conversion of a hydrocarbon into two streams: a relatively pure hydrogen gas-containing stream and a carbon oxide-containing stream. More specifically this invention relates to the use of molten metal or molten bath reaction media in conjunction with the above described conversion.

2. Description of the Prior Art

Two zone molten iron gasifiers are disclosed by U.S. Pat. No. 1,803,221 to Tyrer which blows gases in tangentially to control circulation of iron between the zones; U.S. Pat. No. 4,187,672 to Rasor which produces immiscible iron oxide layer which increases the temperatures required to maintain the bath molten; U.S. Pat. No. 4,338,096 to Mayes which circulates between zones with "froth flow" multi-phase flow; U.S. Pat. No. 2,647,045 to Rummel which also produces iron oxides.

Various patents include U.S. Pat. No. 4,574,714 and U.S. Pat. No. 4,602,574 to Bach each disclosing a single reaction zone involving no circulation between zones.

There are several references that disclose the use of molten iron not only as a gasification media for coal gasification, but also as a pyrolysis media for various hydrocarbon. Not disclosed in these references, however, are the particular arrangements of the zones, the rates of circulation between the zones, and how the transfer is to be controlled among them so as both to maintain heat balance and to obtain a substantially pure high pressure hydrogen stream.

SUMMARY OF THE INVENTION

General Statement of the Invention

Broadly, this invention involves at least three molten metal zone means referred to throughout as first molten metal zone means, second molten metal zone means, and third molten metal zone means. Also, molten metal components are intended to include any molten material layer within a particular zone; e.g., molten metals, such as iron and its alloys, and slag components that form a separate molten layer with such molten metals.

In the first molten metal zone, there is a means for introducing a feed and preferably also (either together with or separately from the feed) slag layer components or molten metal components, both preferably beneath the molten metal surface of material in the first molten metal zone means. Preferably, there is additionally a means for maintaining a slag layer and a first pressure means for controlling pressure in the first zone means. The means for maintaining a slag layer as is well known from other usages of such devices as in the chemical process industries where nuclear level detectors are used for level measurement for example, provides detectors capable of measuring gama radiation from a separate source. These devices can be tied to pressure regulating devices to maintain desired liquid levels in a zone means. Additionally, there is optionally at least one outlet means for one or more of the following: 1) molten metal components; 2) slag layer components; and 3) gaseous components. Finally, there is a first zone recycle inlet means and a first zone recycle outlet means to permit transfer of molten metal from one zone means to another primarily due to density differences.

The second zone (where the carbon is oxidized) comprises preferably a second zone pressure regulating means for controlling pressure and optionally removing gaseous components from the second zone means, a second outlet means for removing molten metal, a second zone recycle inlet means for recirculating molten metal components, and a second zone recycle outlet means for recycling molten metal components, secondary inputs for gases such as oxygen or oxygen and steam.

The third zone comprises a third zone molten metal inlet for introducing molten metal components into the third zone means, a third zone outlet means for removing molten metal components, a third zone pressure regulating means for controlling pressure and removing gaseous components from the third zone means, and optionally, a third zone gaseous components inlet means for introducing gaseous components. Of critical importance to the generation of relatively pure hydrogen in the third zone is the maintenance of a reducing medium, i.e. having a concentration of dissolved carbon in the range of at least 1% by weight. The presence of any significant amount of iron oxides will yield carbon monoxide, thereby preventing the generation of substantially pure hydrogen.

There are several recycle conduits comprising a first recycle conduit, a second recycle conduit, and a third recycle conduit, wherein the first recycle conduit connects first and second zone means; second recycle conduit connects second and third zone means; and finally the third conduit connects the third zone means and the first zone means in a fluid tight fashion to permit the transfer of molten metals from zone one to zone three and back to zone one.

Additionally, the first zone has a means for introducing solid components below the molten metal level through a fourth conduit means through which either solids or gaseous components are introduced into zone one. Additionally, there is a pressure regulating means for removal of gaseous components which initially are of very high temperatures. Prior to contact with the pressure regulating means, gaseous components are cooled by, for example, an indirect heat exchanger. Also, there is a means for removing slag layer components and additional amounts of molten metal should that become necessary due to the increase of molten metal materials during the process of introducing feed components. This situation of increasing amounts of molten metal can occur, for example, in the case of introducing cut up tires which contain steel belted roving within the rubber.

Another particular advantage of the instant invention over the prior art is the invention's ability to deliver a substantially pure hydrogen stream at pressures in the range of one to 3000, more preferably 15 to 1500, and most preferably about 30 to 700 psig.

There are several additional advantages beyond those that have been discussed up to this point. Among these are the fact that it is economical. The system makes it possible to use a wide variety of feeds, whether hazardous or not, with a minimum of handling difficulties or problems. Other operational advantages include an easier heat balance control that permits changes in the amount of hydrogen that may be produced. Conventional hydrogen plants are designed to produce at least some minimum output. Failure to produce a minimum amount of hydrogen as required by the design results in an inoperative or difficult to operate hydrogen plant. One of the advantages of the instant invention is that wide variations in hydrogen output are possible. For example, a hydrogen plant designed for producing twenty million (20 MM) standard cubic feet/day could be cut back from this maximum production to as little as two million (2 MM) standard cubic feet/day. This is to be contrasted with a conventionally designed hydrogen plant designed for twenty million (20 MM) standard cubic feed/day, which could not have its production cut back to much below eight million (8 MM) standard cubic feed/day. Consequently, a hydrogen plant designed in accordance with this invention, has a greater flexibility to produce wide-ranging amounts of hydrogen on demand.

Another clear advantage of a hydrogen plant built in accordance with this invention, is the fact that in one step, one can produce a higher purity of hydrogen than would otherwise be readily made available. This is true because sulfur removal is an integral feature of the invention's reaction vessel by means of a slag layer.

In addition to the above advantages, the hydrogen plant of this invention is especially well suited to use a refinery process stream often identified as a solvent deasphalted pitch (SDA bottoms) which is a refinery byproduct stream produced when petroleum residuum is contacted with a light hydrocarbon solvent. The solvent removes the distillate oils from the residue leaving a pitch which is high in carbon, low in hydrogen, high in sulfur, and high in metals. This stream and other streams having similar properties are present in most refineries, and all of these streams can be readily used as feed to this invention.

Still another advantage to the hydrogen plant of this invention, is the possibility of adding ethane or methane to the high pressure zone to produce substantially pure hydrogen. Additionally, low hydrogen content hydrocarbons can be introduced into the low pressure zone, or zone 1 or zone two, for the purpose of providing the heat balance necessary in order to maintain the hydrogen plant. Examples of low hydrogen content hydrocarbons are the solvent, the asphalt, SDA bottoms mentioned above, residuums from the vacuum distillation tower and coal. In summary, with a three zone system, it is possible to introduce high hydrogen content hydrocarbons (hydrocarbons) to the high pressure zone such as i.e., methane or ethane, and low hydrogen content hydrocarbons at lower pressures such as substantially atmospheric, and by balancing the amount of each of these streams, provide an additional approach and method for heat balance. Hydrocarbons for purposes of obtaining substantially pure hydrogen are materials consisting of substantially only carbon and hydrogen with an H:C mole ratio at least 1:1, preferably at least 1.5:1, and broadly in the range of about 1:1 to 4:1. Note that methane's H:C is 4:1; ethane's is 3:1; and octane's is 2.25:1.

BRIEF DESCRIPTION OF THE DRAWING

The FIGURE discloses a hydrogen plant shown in cross-section side elevation.

DESCRIPTION OF THE PREFERRED EMBODIMENTS

Disclosed in the FIGURE is a molten metal gasifier plant 12 that comprises three molten metal zone means; a first molten metal zone 14, a second molten metal zone 16, and a third molten metal zone 15.

In the first molten metal zone 14 are a means for introducing a feed beneath the surface corresponding to conduit 63 through a first zone inlet means 50; a first zone recycle inlet means 52; a first zone recycle outlet means 54; a gaseous outlet means 39; a first zone slag layer outlet pathway 45; a mixing weir 94; fill plug 70; heat exchanger 32; pressure regulator means 28; a means for removing, cooling, and storing molten materials 42. The walls, floor, and ceiling of first molten metal zone means 14 comprise three layers. The first layer comprises a metal shell 11. The second layer comprises an insulation layer 9, and the third layer comprises a fire brick layer 10.

The second zone or second molten metal zone 16 comprises: a second zone recycle inlet means 51; a second zone recycle outlet means 53; a gaseous outlet means or gas phase outlet 39', a mixing weir means 94'; a molten metal fill plug 70'; walls and ceiling preferably comprising at least three layers; molten metal outlet 92, preferably a gas flame heater inlet 68; inlet conduit 77 for gaseous inputs; inlet conduit 78 for steam or other gaseous inputs.

Molten metal zone 15 includes a third zone recycle inlet 56, a third zone recycle outlet 57; preferably at least three layered walls, floor, and ceiling; a gas phase outlet 39"; a molten metal fill plug inlet 70".

Connecting the first, second, and third molten metal zones respectively, are: conduits 24, 18, and 22. In conduit 22, there is a gas injection means 74' comprising a conduit 75' and valve 72'. In conduit 24, there is also a gas injection means 74 that also comprises a separate conduit 75 and valve 72, which serves an identical function to that gas injection means 72' within conduit 22.

In conduit 63, there are a valve 65, a screw feed 64, powered by a motor 66. Hopper 62 stores materials that are preferably gravity fed into the throat or feeder 64.

Briefly, operation of the system referred to as plant 12 is as follows:

Feed, either in gaseous or solid form or both, is introduced into plant 12 through conduit 63. Gaseous components may be introduced from a source not shown through valve 65. The solid feeds introduced into conduit 63 by means of feeder 64 can be carried by a fluid, a vapor, or other gaseous sweep into first zone feed inlet 50. It is preferable that the feed be introduced below the molten layer 80 which comprises a molten metal, for example, iron or iron containing other materials to improve solubility and reactivity. Generally, a plug of vapor will prevent molten metal from entering into conduit 63. Within first molten metal zone means 14, there are preferably three different layers of material. The first layer is molten metal 80. Within molten metal 80 are dissolved feed and some gaseous inputs which are also introduced through conduit 63. Floating on molten metal layer 80 is a slag layer 84. Slag being less dense generally than molten metal will float on molten metal layer 80. Above slag layer 84 is a vapor layer 81. Within vapor layer 81 are primarily hydrogen, with some carbon monoxide, and a trace of methane.

The precise level of layer 84 is determined by the amount of pressure maintained in vapor layer 81. The amount of pressure in vapor layer 81 is determined by pressure controller or pressure regulator means 28. Pressure regulator means 28 provides a set point control for valve 30 in conduit 40. A pressure sensor 26 monitors the pressure upstream of valve 30 to establish whether valve 30 is opened or closed relative to a source for pressurized vapor not shown. Generally, the valve is either opened or closed to maintain the pressure within the vapor level or vapor layer 81.

To remove slag layer components from layer 84 through first zone slag outlet pathway 45, the pressures in gas layers 81 and 89 are adjusted. The gas pressure within slag removal vessel 44 is determined by a slag pressure control system 48. Slag pressure control system 48 comprises a pressure controller 60 which sets a set point for two valves 47 and 54. Conduit 55 splits into two outlet conduits containing respectively valve 47 and valve 54. Pressure controller 60 establishes a set point for each of these valves 47 and 54 respectively, so as to permit pressurizing inlet gases to maintain the pressure of gas layer 89. When the pressure exceeds the set point value, then one of the two valves opens to relieve the pressure. In other words, valve 47 permits an influx of pressurized gas and valve 54 permits a relief from such pressures so that the overall pressure within vessel 44 as measured in gas layer 89 is maintained at some desired value. This in turn determines through the relative pressure of gas 81 and that of gas 89, the movement of slag layer components from layer 84 through pathway 45 into vessel 44. Within slag removal vessel 44 there is a liquid layer 88, preferably comprising water or some other medium capable of removing substantial amounts of heat. In other words, liquid layer 88 is a quench layer that causes slag layer components in layer 84 to solidify into solid particulates 87. Particulates 87 are introduced through conduit 59 into feeder conduit 58 powered by motor 61. Material transferred by feeder 58 is taken to a location not disclosed. Additional liquid can be introduced into vessel 44 by means of a valve now shown. Additional molten metal components can be introduced into vessel 14 through fill plug 70.

It is to be noted that during initial start-up of plant 12, molten metal can be introduced through any of the fill plugs identified by the numbers 70, 70' and 70". Details of start-up of this at least three zone are discussed and disclosed in U.S. patent application Ser. No. 625,350 and U.S. Ser. No. 542,234.

The precise location of the various layers in each of the zones is determined by the relative pressures present in each of the zones. Accordingly, changing the pressure of the gas layer 81 of vessel 14 will change the location of the molten layers in each of the three zones.

Zone 16 comprises some of the same items as in zones 14 and 15, at least with respect to pressure control. Molten metal from vessel 14 is transferred through conduit 24 in direction shown by arrow 71 to vessel 16 through inlet 51. Material entering inlet 51 is ensured stirring from at least two sources. The first source is weir 94' which ensures that there is an indirect flow from inlet 51 to second zone outlet 53. The second source of stirring is the introduction through conduits 77 and 78 of gaseous components. As explained earlier, inlet conduit 77 for gaseous inputs can introduce oxygen or even hydrocarbon feeds. Inlet conduit for gaseous input 78 can introduce steam or other gaseous components. The gaseous components introduced through these conduits below the molten metal layer 82 in vessel 16 undergo appropriate reactions to be discussed in more detail with respect to an example of this invention. Gaseous components enter the gas phase 83 where they exit through gaseous outlet 39' and insulated chimney outlet 38'. The very hot gaseous components within insulated chimney outlet 38' pass through heat exchanger 32' where they indirectly exchange heat with material entering inlet 34' and leaving outlet 36'. The cooled gas then enters conduit 40' where pressure regulator controller 28' maintains pressure within conduit 40' at some desired value. Valve 30' has a set point to release excess gases to maintain pressure within conduit 40' to some desired value. This value is determined by the desired level of material within vessel 16 and also with respect to the desired pressure sought in vapor layer 83. Molten metal circulating from layer 82 passes through second zone outlet 53 into conduit 18 and then into vessel 15. Molten metal is stirred by mixing weir 94' having similar design as the mixing weirs 94' 94" in zones 14 and 15.

Molten metal entering third zone recycle inlet 56 mixes in layer 85, then in part exits through third zone recycle outlet means 57 into conduit 22 in the direction of the arrow 71.

Optionally, but preferably, gaseous materials, such as ethane and methane are introduced through conduit 96 and valve 98 into inlet for gaseous components 97. Again, as in vessel 16, the gas layer 90 of vessel 15 is maintained at a certain pressure by the same pressure controlling system as described with respect to vessels 14 and 16. Double prime same numbers are used for equivalent functioning elements. The molten metal leaving through third zone recycle outlet means 57 enters conduit 22 and then returns to vessel 14 where it enters molten layer 80 through first zone recycle inlet 52. Optionally, but preferably, there is a gaseous flow control means 74' comprising a valve 72' and conduit 75'. Each of these conduits 75', 75 is downwardly oriented through wall conduits 22 and 24, respectively. Depending upon the amount of gas injected through conduit 75' into conduit 22, or conduit 75 into conduit 24, the movement of molten metal in the direction of arrows 71 can be either increased or decreased. Introduction of gaseous components into conduit 22 through conduit 75' from a source not shown through valve 72' will tend to increase circulation rates in the direction of arrow 71 within conduit 22. However, introduction of gaseous components into recycle conduit 24 decreases the circulation rate as indicated by arrow 71 in conduit 24.

Example 1 discusses in detail the rates appropriate for introducing materials through the various conduits just discussed. Example 1 also discusses methane and ethane as the hydrocarbon feed for generating hydrogen in first zone 14 unless there is also added another feed component having a much higher carbon-to-hydrogen content

TABLE A

Table A tabulates preferred levels of parameters.

| Parameter | Preferred | More Preferred | Most Preferred |
|---|---|---|---|
| Feed C:H Mol Ratio | 0.1–4 | 0.5–3.5 | 2–3 |
| Oxygen Feed O:C Mol Ratio | 1–2 | 1–1.5 | ≈1 |
| Kg Molten Metal Circl:Kg Feed (Kg is kilograms) | 25–5000 | 100–2000 | 200–800 |
| Molten Metal Composition for Fe: | | | |
| 1st bath | 1–5% by wt. of C | 2–4.5% by wt. of C | 3–4.2% by wt. of C |
| 2nd bath | | | |
| 3rd bath | | | |
| Temperature 3rd: | 50° C. Above 1st Bath | 1200–2500° C. | 1225–1300° C. |
| Temperature 2nd (Carbon oxide) Bath: | 50° C. Above 1st Bath | 1250–2550° C. | 1275–1350° C. |
| Temperature 1st: | 1150–2600° C. | 1200–2550° C. | 1250–1325° C. |
| Pressure of 1st Bath: | 1–5 atm | 1–3 atm | 1–2 atm |
| $H_2$ Effluent Pressure of Zone 3 | 1–200 atm | 2–100 atm | 3–50 atm |
| $CO_x$ Effluent Pressure of Zone 2 | 1–200 atm | 2–100 atm | 3–50 atm |
| Δ Elevation Bath 1 minus Bath 2 & Bath 3 (Bath 2 & 3 at roughly the same elevation) | 10–200 meters | 10–150 meters | 10–100 meters |

For details as to how the apparatus is started up and molten metal is introduced into the system and initially induced to circulate, reference is made to U.S. patent application Ser. No. 542,234, filed Jun. 21, 1990 (attorney docket no. 6333AUS). In this U.S. patent application shutdown procedures are also disclosed.

EXAMPLE 1

(Invention Using Supplemental Carbon Feed Plus Methane as Primary Feed)

This example shows the problem due to using only methane or ethane as the sole feed to generate hydrogen. The energy required to disassociate methane (and/or ethane) into carbon and hydrogen, an endothermic reaction, is not balanced by the energy that is released when carbon oxides are produced. This is true because the energy from converting carbon monoxide to carbon dioxide is not significantly transferred to the molten metal, but instead escapes from the system as part of the heated gases exiting through conduit 38' connected to second zone 16. Only the heat released by reaction of carbon and oxygen to form carbon monoxide is transferred to the molten metal. Essentially, hydrogen is produced in first zone 14 and carbon oxides are produced in second zone 16.

Also shown in this example is the necessity that the circulation rate must be at least 25 pounds of iron for each pound of carbon dissolved from any feeds introduced into hydrogen plant 12.

With reference to the Figure the following is a brief discussion of steady-state operation of a preferred embodiment of this invention.

The most straight forward way to understand the steady-state operation of the molten metal gasifier of this invention is to consider the relationship of the various energy and material inputs and outputs of the system.

At steady-state operation, with respect to energy balance considerations, the rate at which hydrocarbons thermally dissociate to hydrogen and carbon (with the carbon dissolving in the molten metal) in vessel 14, the first zone, determines the heat requirement for vessel 14. This heat requirement is satisfied by the reduction in temperature of the molten metal entering vessel 14. This must be counterbalanced by the exothermic reaction of carbon dissolved in the molten metal in vessel 16 being oxidized to carbon monoxide. The exothermic reaction in vessel 1 is accommodated by the molten metal leaving at a temperature higher than its entering temperature. Preferably the temperature of the second bath is maintained at least 150° C. (270° F.) higher than that of the first bath. For the entire system to remain at steady-state several simultaneous requirements must balance.

First, the net heat requirements in vessels 14 and 15, any system heat losses, and the heat required to heat all of the feeds to the system to its operating temperature must be balanced by the heat released in vessel 16.

Second, the rate of molten metal circulation must be such that the difference in carbon concentration between entering and leaving molten metal multiplied by the mass flow rate of molten metal is equal to the net carbon feed rate to vessel 14. The minimum melting point for molten iron occurs with a carbon content of approximately 4.2% by weight. At higher or lower carbon contents the melting point of the iron carbon solution increases. At approximately 6% by weight, no more carbon is soluble at any temperature. The minimum carbon content which would result if all of the carbon entering vessel 14 were oxidized is 0. While 0 represents the extreme lower limit the actual practical limit is somewhat higher. This limit will be discussed later. This means that the minimum molten metal circulation rate is 1/(0.042–0) or 23.8 lbs of molten metal per pound of carbon.

Third, the density differences in conduits 22 and 24 must be sufficient to establish and maintain the desired circulation rate of molten metal. The density difference between conduits 22 and 24 results in part from temperature difference, from difference in carbon content and from the injected gas content of the molten metal in each of the two conduits.

If sulfur or other undesirable contaminants are present in the first feed the sulfur will form hydrogen sulfide and exit with the gas leaving vessel 14. For most uses the hydrogen sulfide is unacceptable. In most applications where it is present in refinery streams it is removed by special absorption systems. With the instant invention it is possible to add certain fluxing compounds which contain calcium, e.g. calcium carbonate or calcium oxide. The fluxing compounds form a layer of molten slag which floats on top of the molten metal. The calcium contained in the fluxing compounds reacts to form calcium oxide at the temperature of vessel 14. Calcium oxide reacts with sulfur in the molten metal forming calcium sulfide which remains in the slag layer. Higher carbon contents in the molten metal favor the reaction of sulfur in the molten metal reacting with the slag layer. Flux and slag may be periodically or continuously added and/or withdrawn.

Because the molar ratio of hydrogen to carbon increases as the carbon number of paraffin gases decreases the endothermic heat required per mol of carbon is highest for methane and next highest for ethane. More heat is required by the endothermic heat of reaction for the dissociation of methane and ethane than is produced by the combustion of the carbon contained in them to carbon monoxide. It is not possible to realize the heat generated by reacting the carbon to carbon dioxide because when carbon monoxide forms it rapidly exits the molten metal bath. If sufficient oxygen is present to allow the formation of carbon dioxide this formation occurs in the gas space 83 above the molten metal layer and does not heat the molten metal. The primary result of oxidizing carbon monoxide to carbon dioxide is to increase the temperature of the gas leaving vessel 16. It is not practical to heat the incoming streams above 816° C. (1500° F.) due to heat exchanger material limitations. It is unlikely that a higher temperature in the exit gas would be of much benefit.

A critical feature of the instant invention is what when gaseous feeds to vessel 14 do not have sufficient carbon to allow the system to operate in heat balance, high carbon content feeds such as solvent deasphalted pitch are added with the gaseous feeds so that the system is in heat balance. If excess high carbon containing feeds are added in the feed, steam is added to vessel 16 to form hydrogen and carbon monoxide, and exothermic reaction, to keep the system in heat balance.

The pressure in vessel 14 may range from just over atmospheric pressure (14.7 psia) to in excess of 400 psia. The upper pressure is not limited by any major consideration except the economical balance between the extra cost of higher pressure rated vessels compared to the savings in compression cost realized by producing hydrogen at a higher pressure. At a pressure greater than 400 psia the chemical equilibrium between methane, hydrogen and carbon results in the hydrogen purity in the gas leaving vessel 14 dropping below 95% when the temperature in vessel 14 is 1371° C. (2500° F.).

Operating temperature is constrained by the limits of the refractory linings in vessels 14, 15, and 16 and the increase in heat loss as the temperature increases. The combination of high temperature, high feed rates and high molten metal circulation rates results in more rapid erosion rates for the refractory linings. Heat exchange of the feed gases in vessel 14 and the oxygen and steam in vessel 16 with the hot exiting gases is desirable. Feed effluent heat exchange is constrained by the cost of heat exchange equipment on the one hand and the savings resulting from greater thermal efficiency on the other. Molten metal circulation rates must be at least 24 lbs molten metal per lb carbon. The most desirable circulation rate is in the range of 100 to 1000 lbs molten metal per lb carbon.

The following details of Example 1, illustrate the above concepts with specific operating conditions. For this case the feed consists of pure methane. This is in no way intended to limit the range of hydrocarbon feeds which can be processed but rather is chosen for illustrative purposes. The feed rate chosen is 16 grams per hour. This is approximately the molecular weight of methane in grams, a rate of 16 tons per hour could have just as easily been chosen. Approximately 4 grams of the methane form hydrogen, the balance, 14 grams form carbon which dissolves in the molten metal. For the purposes of this example the feed methane is heated to 760° C. (1400° F.) by heat exchange with the hydrogen exiting vessel 15. The heat necessary for the endothermic reaction described above and the heat necessary to raise the methane to reaction temperature, in this case 1250° C. (2282° F.), is approximately 72,000 cal. In the second zone 16, the 12 grams of carbon are oxidized to carbon monoxide by oxygen which has been heat exchanged with the exiting carbon monoxide to 760° C. (1400° F.). The heat produced by this reaction less the heat necessary to heat the oxygen to operating conditions, in this case 1291° C. (2356° F.), is approximately 62,000 calories. Additional heat losses in the system are dependent on the particulars of the system. In this example a value of 10,000 calories will be used.

The system is not in heat balance because 72,000 calories are required in vessel 15, 10,000 calories are lost by the system and only 62,000 calories are produced in vessel 16. The deficit is approximately 20,000 calories. By adding an additional 13 grams of high carbon content feed to vessel 14, 15,000 calories of heat are required in vessel 14, however, 62,000 additional calories are generated in vessel 16 resulting in an excess of heat. This allows a quantity of steam to be added to vessel 16 resulting in an endothermic reaction of steam with carbon to produce hydrogen and carbon monoxide. The rate of steam addition can be varied to keep the system in heat balance.

When flux is added to vessel 14, additional heat is required to heat the flux to operating temperature. The rate of flux addition is determined by the feed rate of high carbon content material multiplied by its sulfur content and by the efficiency of the slag in reacting with sulfur. As more flux is added to vessel 14 less steam is added to vessel 16 to keep the system in heat balance.

MODIFICATIONS

Specific compositions, methods, or embodiments discussed are intended to be only illustrative of the invention disclosed by this specification. Variation on these compositions, methods, or embodiments are readily apparent to a person of skill in the art based upon the teachings of this specification and are therefore intended to be included as part of the inventions disclosed herein. For example, where the Figure does not show a piece of equipment, such as a magnetic pump, then such equipment is not required by this invention in order to function, and therefore, unless expressly stated otherwise, may be excluded.

A variation of this invention consists in installing a cooling jacket between the refractory and the steel wall of all or part of the system. The cooling rate could be adjusted so that a layer of solidified slag or iron would form on the inside wall of the refractory to prevent or reduce attack by slag or molten iron. Such an arrangement can be particularly useful in areas where molten slag contacts refractory lining.

Another variation of this invention is to feed hazardous organic chemicals such as dioxin, polychlorinated biphenyls, nitriles, polyhalongenated organic compounds, and the like as all or part of the high carbon content (carbonaceous) feed. These materials can either be injected beneath the surface of molten metal in the first zone or injected into an outflow conduit 24 also referred to as recycle conduit for return 24. Introduction of materials into conduit 24 permits a longer residence time at elevated temperatures. At temperatures above 1200° C. (2192° F.), all hazardous organic materials rapidly and completely decompose, i.e. chemical bonds such as C—C bonds thermally break. Sulfur, chlorine, and bromine are captured by slag layer 84 or perhaps even 86. Heavy metals such as chromium, cadmium, mercury, lead, or arsenic either form an alloy with molten iron or are captured by the slag.

Still another variation of this invention is to use spent limestone from limestone scrubbers as all or part of the source for slag components, e.g., a calcium feed to first zone 14. Spent limestone from limestone scrubbers seldom contain more than 10% sulfur and at least 80% of the calcium present is either calcium oxide or calcium carbonate.

Still another variation of this invention is to add baffles or mixing means made of refractories similar or identical to refractory linings of the first and second zones in order to cause more desirable flow patterns in either the first or the second zone.

And still another variation of this invention is to use an electromagnetic pump as a secondary means of controlling flow rate of molten iron. These types of pumps were developed for circulating liquid metal coolants in breeder reactors in the nuclear industry.

Still another example of this invention is the feeding of catalyst containing heavy metals such as cracking catalyst that arise out of fluid catalytic cracking or metals removal systems, such as disclosed in U.S. Pat. No. 4,390,415 to Myers, U.S. Pat. No. 4,406,773 to Hettinger, U.S. Pat. No. 4,427,539 to Busch, etc. Upwards of as much as 7000 to 8000 ppm of metal on catalyst is not uncommon in operations concentrating on cracking reduced crudes to produce gasoline-like components. The process of plant of the instant invention provide particular benefits with respect to obtaining metals from heavy metal contaminated cracking catalysts. Among the steps useful in obtaining heavy metal such as vanadium from molten metal baths is to remove all carbon components at some point during the processing and then induce the heavy metals to enter a slag layer and recover the heavy metals from the slag layer. M throughout specification represents thousands (1000) and ppm means parts per million by weight.

In still another modification, the addition of nickel or manganese to the molten metal iron permits one to improve the properties of molten metal iron from the prospective of being able to more readily dissolve and carry out chemical reactions.

Three or more multiple zones of molten metal baths can be used e.g., for instances where different feeds are made to several different baths.

What is claimed is:

1. A process for generating both a substantially pure hydrogen stream at a pressure in the range of 1 to 200 atmospheres and a fuel gas stream, said process comprising;

(a) introducing into a first molten metal bath at 1200° to 2550° C. (2192°–4532° F.) in a first zone a carbonaceous first feed to maintain 1–5 wt % dissolved carbon in said first molten metal bath;

(b) transferring at least a portion of said first molten metal bath to a second molten metal bath in a second zone; maintaining the temperature in said second metal bath at least 150° C. (270° F.) higher than said first molten metal bath, and maintaining both the temperature and reducing the carbon content of said second molten metal bath by adding a controlled amount of molecular oxygen to oxidize carbon in said second molten metal bath and to produce said fuel gas stream;

(c) transferring at least a portion of molten material from said second molten metal bath to a third molten metal bath in a third zone, maintaining said third molten metal bath to have about 1–5 wt % carbon content and a temperature at least 50° C. (90° F.) higher than said first molten metal bath by adding a pure hydrocarbon second feed to said third zone whereby substantially pure hydrogen gas is generated within said third zone; and (d) recycling in a closed loop at least a portion of said third molten metal bath back to said first molten metal bath;

(e) maintaining the total amount of molten material transferred from said first zone to said second zone and back to said first zone at 25 to 5000 kg molten metal per kg of total feed comprising said carbonaceous first feed and said pure hydrocarbon second feed;

(f) adding about 1–2 mols oxygen to said second zone per mol of carbon in the first feed; and (g) maintaining the carbon content above about 1% by weight in all of said molten metal baths.

2. The process of claim 1, further comprising:

adding $H_2O$ as steam to said second zone to balance the heat generated by reaction of carbon with oxygen in said second zone, so as to maintain the temperature in said second molten metal bath within a desired range.

3. The process of claim 1, wherein about 100–2000 kg molten metal is circulated per kg of total feed; total oxygen-to-carbon mol ratio is in the range 1:1 to 1.5:1; and total carbon fed, based on both carbonaceous first feed added to said first zone and pure hydrocarbon second feed added to said third zone, is about 0.1–4 mols per mol of hydrogen fed in said total feed.

4. The process of claim 1, wherein said first zone is raised about 1 to 200 meters above said second zone, and said process further comprises; aiding molten metal bath material transfer between zones by effecting density differences between said baths by controlling temperature and carbon content differences of said molten metal baths between respective zones.

5. The process of claim 3, wherein said first zone is raised about 1–200 meters above said second zone, and said process further comprises aiding molten metal bath material transfer between zones by effecting density differences between said baths by controlling temperature and carbon content of said baths between respective zones.

6. A process for generating a substantially pure hydrogen stream at 1–200 atmospheres and a fuel gas stream, said process comprising:

a. providing first, second, and third molten metal baths within first, second and third hermetic zones, said baths being interconnected to permit molten metal flow from said first to said second to said third, and recycle back to said first bath;

b. maintaining said first bath at about 1200°–2550° C., and said second and third baths at least 50° C. higher than said first bath;

c. feeding a hydrocarbon first feed to said first bath;

d. feeding about 1–2 mols oxygen to said second bath per mol of carbon in said hydrocarbon first feed fed to said first bath, thereby producing said fuel gas in said second zone;

e. circulating 25–5000 kg molten metal in a closed loop from said first bath to said second bath and thence to said third bath, and recycling molten metal from said third bath back to said first bath for each kg carbon contained in said first hydrocarbon feed and a pure second hydrocarbon feed supplied to said third metal bath thereby producing substantially pure hydrogen gas in said third zone;

f. adding about 1–2 mols oxygen to said second zone per mol of carbon in said hydrocarbon first feed; and g. aiding circulation by effecting density differences of said molten metal by controlling temperature and carbon content variations of said molten metal between said zones.

* * * * *